United States Patent [19]

Akagawa et al.

[11] Patent Number: 5,883,174
[45] Date of Patent: Mar. 16, 1999

[54] POLYPROPYLENE RESIN COMPOSITION

[75] Inventors: Tomohiko Akagawa; Ikunori Sakai; Saburo Hinenoya; Yasuo Kita, all of Sakai; Kaoru Inoue, Toyota; Takeyoshi Nishio, Okazaki; Takao Nomura, Toyota, all of Japan

[73] Assignees: Ube Industries, Ltd., Ube; Toyota Jidosha Kabushiki Kaisha, Toyota, both of Japan

[21] Appl. No.: 680,971

[22] Filed: Jul. 16, 1996

[30] Foreign Application Priority Data

Jul. 17, 1995 [JP] Japan .................................... 7-180041
Jul. 18, 1995 [JP] Japan .................................... 7-181552

[51] Int. Cl.$^6$ ............................... C08J 5/10; C08K 3/34; C08L 23/12
[52] U.S. Cl. ........................... 524/451; 524/505; 524/515
[58] Field of Search .................... 524/451, 505, 524/515, 529, 552, 534, 570, 571, 582, 583

[56] References Cited

U.S. PATENT DOCUMENTS 4,946,898  8/1990  Kasahara et al. ........................ 525/240
5,543,454  8/1996  Kamakura et al. ...................... 524/451

FOREIGN PATENT DOCUMENTS 0583132  2/1994  European Pat. Off. .
58-168649  10/1983  Japan .
3-172339  7/1991  Japan .
4-57848  2/1992  Japan .

OTHER PUBLICATIONS

Patent Abstracts of Japan, vol. 95, No. 5, Jun. 30, 1995 & JP A, 07–053,843.

*Primary Examiner*—James J. Seidleck
*Assistant Examiner*—U. K. Rajguru
*Attorney, Agent, or Firm*—Finnegan, Henderson, Farabow, Garrett & Dunner, L.L.P.

[57] ABSTRACT

A polypropylene resin composition having excellent rigidity, impact resistance and formability (moldability) and thus useful for the interior parts of automobile, includes (A) a crystalline E/P block copolymer containing a fraction Ac soluble in p-xylene at room temperature and having an ethylene content of 18 to 22%; (B) a crystalline E/P block copolymer containing a fraction Bc soluble in p-xylene at room temperature and having an ethylene content of 27 to 40% and (C) talc particles having an average size of 3 to 5 $\mu$m and largest size less than 20 $\mu$m, in which composition, (a) the p-xylene-soluble fractions Ac and Bc are in contents As and Bs based on the total weight of the copolymers (A) and (B) and satisfying As+Bs=7 to 17% by weight and As/(A+Bs)=0.1 to 0.6; (b) an isotactic pentad fraction of propylene in each of copolymers (A) and (B) is 96% or more, and the mixture of the copolymers (A) and (B) has a MFR of 20 to 35 g/10 min at 230° C. under 2160 g load; and (c) the copolymers (A) and (B) are in a total weight content of 50 to 95% and talc (C) is in a weight content of 5 to 50%.

6 Claims, No Drawings

POLYPROPYLENE RESIN COMPOSITION

BACKGROUND OF THE INVENTION

1. Field of the Invention

The present invention relates to a polypropylene resin composition. More particularly, the present invention relates to a polypropylene resin composition capable of forming shaped articles that are light, have excellent rigidity, are resistant to thermal deformation, have impact resistance and moldability and have an enhanced resistance to whitening due to stress applied thereto during a forming procedure. The polypropylene resin composition of the present invention is advantageously usable for interior parts of automobiles and, typically, the trim.

2. Description of the Related Art

It is known that polypropylene resin compositions comprising, as a principal component, a polypropylene resin, for example, a crystalline ethylene-propylene block copolymer, combined with an elastomer such as an ethylene-propylene copolymer rubber, ethylene-butene copolymer rubber or hydrogenation product of a styrene-butadiene block copolymer, and an inorganic filler such as talc, have excellent rigidity and impact strength and superior moldability, and thus have been widely employed for the production of parts of automobiles.

Also, studies have been conducted to enhance the rigidity, impact resistance and moldability of the polypropylene resin compositions by variously changing the polypropylene resin, the elastomer and the inorganic filler.

As an above-mentioned type of polypropylene resin composition, Japanese Unexamined Patent Publication (Kokai) No. 58-168649 discloses a combination of a crystalline ethylene-propylene block copolymer with a specific ethylene-α-olefin copolymer rubber and talc.

Also, a combination of a crystalline ethylene-propylene block copolymer with a specific hydrogenated styrene-butadiene block copolymer, ethylene-propylene copolymer rubber and talc has been discussed in Japanese Unexamined Patent Publication (Kokai) No. 3-172,339.

Further, a combination of a crystalline ethylene-propylene-block copolymer with a specific hydrogenated styrene-butadiene block copolymer, ethylene-butene copolymer rubber and talc has been discussed in Japanese Unexamined Patent Publication (Kokai) No. 4-57,848.

Although the above-mentioned conventional polypropylene resin compositions exhibit a high levels of rigidity and impact resistance, they are not yet satisfactory in lightness and exhibit an unsatisfactory resistance to whitening of the resultant shaped article.

SUMMARY OF THE INVENTION

An object of the present invention is to provide a polypropylene resin composition which can satisfy the recent requirements of lightness, excellent rigidity and impact resistance, superior moldability and a high resistance to whitening due to a stress applied thereto during forming procedure, for interior parts of automobile and, typically, the trim.

The above-mentioned object can be attained by the polypropylene resin composition of the present invention which comprises:

(A) a crystalline ethylene-propylene block copolymer in which a fraction Ac soluble in p-xylene at room temperature and containing 18 to 22% by weight of copolymerized ethylene is contained;

(B) a crystalline ethylene-propylene block copolymer in which a fraction Bc soluble in p-xylene at room temperature and containing 27 to 40% by weight of copolymerized ethylene is contained; and (C) talc particles having an average particle size of 3 to 5 $\mu$m and a largest particle size of less than 20 $\mu$m, measured by a laser diffraction method, wherein (a) the p-xylene-soluble fractions Ac and Bc are in contents As and Bs, respectively, based on the total weight of the copolymers (A) and (B), and satisfying the relationships (1) and (2):

$$As+Bs=7 \text{ to } 17\% \text{ by weight} \tag{1},$$

and $$As/(As+Bs)=0.1 \text{ to } 0.6 \tag{2};$$

(b) an isotactic pentad fraction (mmmm) of copolymerized propylene contained in each of the copolymers (A) and (B) is 96% or more, and the mixture of the copolymer (A) with the copolymer (B) has a melt flow rate of 20 to 35 g/10 minutes determined at a temperature of 230° C. under a load of 2160 g; and (c) the total content of the copolymers (A) and (B) is 50 to 95% by weight, and the content of the talc (C) is 5 to 50% by weight, based on the total weight of the copolymers (A) and (B) and the talc particles (C).

In a preferable embodiment of the polypropylene resin composition of the present invention, the contents As and Bs of the p-xylene-soluble fractions Ac and Bc satisfies the relationship (1a):

$$As+Bs=8 \text{ to } 17\% \text{ by weight} \tag{1a};$$

the mixture of the copolymer (A) with the copolymer (B) has a melt flow rate of 25 to 35 g/10 minutes, determined at a temperature of 230° C. under a load of 2160 g; the total content of the copolymer (A) and the copolymer (B) is 75 to 95% by weight; and the content of the talc (C) is 5 to 25% by weight, based on the total weight of the copolymers (A) and (B) and the talc particles (C).

In this embodiment, the polypropylene resin composition optionally, further comprises (D) an ethylene-α-olefin copolymer rubber in a content of 10% by weight or less, based on the total weight of the copolymers (A) and (B), the talc particles (C) and the rubber (D).

The above-mentioned polypropylene resin composition of the present invention optionally, further comprises (E) 10 to 50 parts by weight, per 100 parts of the total of the copolymer (A) and the copolymer (B), of a polypropylene homopolymer having an isotactic pentad fraction of 96% or more, and a melt flow rate of 25 to 35 g/10 minutes, determined at a temperature of 230° C. under a load of 2160 g.

In another preferable embodiment (2) of the polypropylene resin composition of the present invention, the p-xylene-soluble fraction of the copolymer (A) has an intrinsic viscosity of 7 dl/g or more, determined in decalin at a temperature of 135° C.; the p-xylene-soluble fraction of the copolymer (B) has an intrinsic viscosity of 4 dl/g or less, determined in decalin at a temperature of 135° C.; the contents As and Bs of the p-xylene-soluble fractions Ac and Bc contained in the copolymers (A) and (B) satisfy the relationship (2a):

$$As/(As+Bs)=0.2 \text{ to } 0.6 \tag{2a};$$

the mixture of the copolymer (A) with the copolymer (B) has a melt flow rate of 20 to 30 g/10 minutes determined at a temperature of 230° C. under a load of 2160 g; the total content of the copolymer (A) and the copolymer (B) is 50 to 75% by weight; and the content of the talc (C) is 15 to 30% by weight, and which further comprises (D) 10 to 20% by weight of an ethylene-α-olefin copolymer.

In the embodiment (2), the polypropylene resin composition optionally, further comprises (F) 10 to 200 parts by weight, per 100 parts by weight of the ethylene-α-olefin copolymer (D), of a straight or branched chain, hydrogenated polybutadiene block polymer which is represented by the general formula:

I-II or (I-II)n wherein I represents a hydrogenated polybutadiene block unit having a content of 1,2-vinyl structures of 20 molar % or less, II represents a hydrogenated polybutadiene block unit having a content of 1,2-vinyl structures of 30 to 70 molar %, n represents an integer of 2 or more, and which has a ratio [I/(I+II)] in weight of the hydrogenated polybutadiene block unit (I) to the total of the hydrogenated polybutadiene block units (I) and (II), of 15 to 45%.

DESCRIPTION OF THE PREFERRED EMBODIMENTS

The inventors of the present invention carefully studied polymeric compositions of the crystalline ethylene-propylene block copolymers which are usable as principal components of the polypropylene resin compositions.

As a result, it was found that when a blend of two types of crystalline ethylene-propylene block copolymers different from each other in specific fraction soluble in p-xylene at room temperature is combined with a specific amount of talc and optionally a specific amount of an ethylene-α-olefin copolymer rubber and/or a polypropylene homopolymer, the resultant polypropylene resin composition is useful for the production of a shaped article having a high lightness in weight and exhibiting excellent rigidity and impact resistance and superior resistance to whitening due to a stress applied thereto during the forming procedure. The present invention was completed on the basis of the above-mentioned finding.

In the polypropylene resin composition of the present invention, two types of crystalline ethylene-propylene block copolymers (A) and (B) different from each other in specific fraction soluble in p-xylene at room temperature are used in a mixture thereof. Each of the crystalline ethylene-propylene block copolymer components (A) and (B) is prepared by the procedures comprising a first step wherein a crystalline propylene homopolymer (which will be referred to as a polypropylene ingredient hereinafter) is prepared, and a second step wherein the polypropylene ingredient is copolymerized with ethylene and propylene to provide a ethylene-propylene copolymer (which will be referred to as an E/P copolymer rubber hereinafter). The above-mentioned homopolymerization and copolymerization are carried out in the presence of a catalyst, for example, a Zieglor-Natta catalyst comprising titanium trichloride and an alkyl aluminum compound or a composite catalyst comprising a magnesium compound and a titanium compound.

The crystalline ethylene-propylene block copolymer component (A) contains a fraction Ac thereof soluble in p-xylene at room temperature, which fraction contains 18 to 22% by weight of copolymerized ethylene.

Also, the crystalline ethylene-propylene block copolymer component (B) contains a fraction Bc thereof soluble in p-xylene at room temperature, which fraction contains 27 to 40% by weight of copolymerized ethylene.

In the mixture of the crystalline ethylene-propylene block copolymer components (A) and (B), a total amount of the p-xylene-soluble fractions Ac and Bc in the copolymer components (A) and (B) corresponds to 7 to 17% of the total weight of the copolymer components (A) and (B), namely As+Bs=7 to 17% by weight (1), and the weight contents As and Bs of the p-xylene-soluble fractions Ac and Bc in the copolymer components (A) and (B) satisfy the relationship (2):

$$As/(As+Bs)=0.1 \text{ to } 0.6 \quad (2).$$

Also, in the mixture of the crystalline ethylene-propylene block copolymer compounds (A) and (B), the isotactic pentad fraction (mmmm) of copolymerized propylene contained in each of the copolymer components (A) and (B) is 96% or more, and the melt flow rate (MFR) of the mixture of the copolymer components (A) and (B) is 20 to 35 g/10 minutes determined at a temperature of 230° C. under a load of 2160 g. The isotactic pentad fraction (mmmm) refers to a content of propylene monomer units located in the center portions of series chain composed of five propylene monomers successively metho-bonded to each other, which chain is an isotactic series chain consisting of pentad units in a crystalline polypropylene molecular chain, and is measured by using 13C-NMR. Particularly, the mmmm is determined as an mmmm peak fraction included in the entire absorption peaks of methyl carbon band in the 13C-NMR spectrum.

If the mmmm is less than 96%, the resultant polypropylene resin composition is unsatisfactory in rigidity and heat resistance thereof. If the MFR of the mixture of the copolymer components (A) and (B), determined at a temperature of 230° C. under a load of 2160 g is less than 20 g/10 minutes, the resultant polypropylene resin composition exhibits unsatisfactory melt-flowability and formability. Also, if the MFR is more than 35 g/10 minutes, the resultant polypropylene resin composition exhibits an unsatisfactory impact resistance and the resultant shaped article is difficult to process by a heat melt-bonding procedure.

The components (A), (B), (C) and optionally (D) and (E) of the polypropylene resin composition of the present invention will be explained below.

Copolymer Components (A) and (B)

The copolymer component (A) usable for the present invention is a crystalline ethylene-propylene block copolymer containing a fraction Ac thereof soluble in p-xylene at room temperature. The p-xylene-soluble fraction Ac contains 18 to 22% by weight, preferably 19 to 21% by weight, of copolymerized ethylene. The copolymer component (A) satisfies the requirements for the mmmm and the MFR as mentioned above.

The copolymer component (B) usable for the present invention is a crystalline ethylene-propylene block copolymer containing a fraction Bc thereof soluble in p-xylene at room temperature. The p-xylene-soluble fraction Bc contains 27 to 40% by weight, preferably 30 to 35% by weight of copolymerized ethylene. The copolymer component (B) satisfies the requirement for the mmmm and the MFR as mentioned above.

The weight contents As and Bs of the p-xylene-soluble fractions Ac and Bc in the copolyester components (A) and (B) is determined in the following manner.

A sample of a crystalline ethylene-propylene block copolymer in an amount of 5 g is completely dissolved in boiling p-xylene, then the resultant copolymer solution is cooled to a temperature of 20° C. and left to stand at this temperature for one day and night. Thereafter, a resultant precipitated fraction insoluble in p-xylene at 20° C. is removed from the cooled solution by filtering. The resultant filtrate is mixed with 1500 ml of acetone, and the mixture is stirred to allow the copolymer fraction soluble in p-xylene at room temperature to precipitate. The precipitate is filtered and dried, and then the weight of the copolymer fraction soluble in p-xylene at room temperature is measured. From the measurement result, a weight content of the fraction soluble in p-xylene at room temperature in the copolymer component (A) or (B) is determined.

The fraction soluble in p-xylene at room temperature substantially corresponds to the E/P copolymer rubber produced in the above-mentioned second step of the copolymerization procedure. The ethylene content of the fraction soluble in p-xylene at room temperature is determined in such a manner that an infra-red absorption spectrum of a specimen, prepared by pressing the p-xylene-soluble fraction into a form of film, is determined by an infra-red spectrophotometer, and the content of the copolymerized ethylene in the p-xylene-soluble fraction is determined from the absorbances (characteristic absorptions) of methyl groups ($-CH_3$, 1155 $cm^{-1}$) and methylene groups ($-CH_2-$) appearing in the infra-red absorption spectrum, by using a Gardner's calibration curve (I. J. Gardner et al., Rubber Chem. Tech., 44, 1015 (1971)).

Generally, the crystalline ethylene-propylene block copolymers are different in performance depending on the weight content of the fraction soluble in p-xylene at room temperature and the content of the copolymerized ethylene in the fraction. Namely, the higher the weight content of the fraction soluble in p-xylene at room temperature, the higher the impact resistance of the resultant polypropylene resin composition and the lower the rigidity of the resultant composition. When the weight contents of the fractions in two or more copolymers are the same as each other, the lower the content of the copolymerized ethylene, the higher the mechanical strength and the higher the resistance to whitening due to stress of the resultant composition. Also, the higher the content of the copolymerized ethylene, the higher the impact resistance and lower the gloss. In the polypropylene resin composition of the present invention, the copolymer component (A) effectively imparts improved mechanical strength and resistance to whitening due to stress to the composition, and the copolymer component (B) advantageously imparts an enhanced impact resistance to the composition.

In the p-xylene-soluble fraction Ac in the copolymer component (A), the content of the copolymerized ethylene must be 18 to 27% by weight based on the weight of the fraction Ac soluble in p-xylene at room temperature. If the content of the copolymerized ethylene is less than 18% by weight, the resultant copolymer component exhibits an unsatisfactory effect to the enhancement of the impact resistance on the resultant polypropylene resin composition.

Also, if the content of the copolymerized ethylene is more than 22% by weight, the resultant copolymer component exhibits an unsatisfactory enhancement of the resistance to whitening due to stress of the resultant polypropylene resin composition.

Also, in the p-xylene-soluble fraction Bc in the copolymer component (B), the content of the copolymerized ethylene must be 27 to 40% by weight based on the weight of the fraction Bc of the component (B) soluble in p-xylene at room temperature. If the content of the copolymerized ethylene is less than 27% by weight or more than 40% by weight, the resultant copolymer component exhibits an unsatisfactory impact resistance-enhancing effect on the resultant polypropylene resin composition.

In the mixture of the copolymer component (A) with the copolymer component (B), the p-xylene-soluble fractions Ac and Bc of the copolymer components (A) and (B) are in contents As and Bs, respectively, based on the total weight of the copolymer components (A) and (B). Also, the weight contents As and Bs of the p-xylene-soluble fractions in the copolymer components (A) and (B) satisfy the requirements (1) and (2):

$$As + Bs = 7 \text{ to } 17\% \text{ by weight} \tag{1}$$

and $$As/(As+Bs) = 0.1 \text{ to } 0.6 \tag{2};$$

preferably $As/(As+Bs) = 0.3$ to $0.5$.

If the total content As+Bs of the p-xylene-soluble fractions Ac and Bc in the copolymer components (A) and (B) is less than 7% by weight, or more than 17% by weight, the resultant polypropylene resin composition is unsatisfactory in both the impact resistance and rigidity, and thus unsuitable to produce the interior parts of an automobile.

Also, if the ratio As/(As+Bs) is less than 0.1, the resultant mixture of the copolymer components (A) and (B) exhibits a very poor whitening resistance-improving effect. If it is more than 0.6, the resultant polypropylene resin composition exhibits an unsatisfactory impact resistance and an undesirably high gloss and thus is unsuitable for the interior parts of an automobile.

In the polypropylene resin composition of the present invention, the copolymer components (A) and (B) must be present in a total content of 50 to 95% by weight, preferably 70 to 90% by weight.

If the total content of the copolymer components (A) and (B) is less than 50% by weight, the resultant polypropylene resin composition exhibits an unsatisfactory formability. Also, if it is more than 95% by weight, the resultant polypropylene resin composition exhibits unsatisfactory rigidity and resistance to thermal deformation.

The copolymer components (A) and (B) may be produced separately from each other by the above-mentioned catalytic copolymerization procedures and blended together. Alternatively, the second step of the catalytic polymerization procedures, may be carried out in multiple copolymerization vessels so as to continuously produce the copolymer components (A) and (B) separately from each other in one of the copolymerization vessels.

Talc Component (C)

In the polypropylene resin composition of the present invention, a specific talc particles (C) having an average particle size of 3 to 5 $\mu$m preferably 3 to 4 $\mu$m and a largest particle size less than 20 $\mu$m or less, preferably less than 10 $\mu$m, measured by a laser diffraction method, are employed in an amount of 5 to 50% by weight, preferably 7 to 30% by weight.

If the talc component (C) is employed in an amount less than 5% by weight, the rigidity-enhancing effect thereof is insufficient. If the content of the talc component (C) is more than 50% by weight, the resultant polypropylene resin composition has too a high specific gravity and thus cannot be utilized to produce the interior parts of an automobile having a light weight.

The average particle size and the largest particle (top-cut) size of the talc particles are determined by using a microtrack particle size distribution meter (Model: 7995-40DRA, made by Nikkiso K.K.) and in accordance with the Fraunhofer diffraction formula for front-scattering laser rays and the side-scattering halogen ray intensity diffraction formula.

If the average particle size of the talc component (C) is less than 3 μm, the talc particles have a low average aspect ratio and thus exhibit an insufficient rigidity-enhancing effect. Also, if the average particle size is more than 5 μm, the resultant polypropylene resin composition exhibits unsatisfactory impact resistance and rigidity.

The largest particle size (top cut size) is the size of the largest particle in the talc particles (C) and must be less than 20 μm. If the largest particle size is 20 μm or more, the content of talc particles having large size becomes undesirably high, and thus the impact resistance-enhancing effect of the talc component (C) reduces.

The talc component (C) usable for the present invention can be produced by milling rough talc stones with a conventional mill, for example, a roller mill or a crusher to approach the target average size of the talc particles, and thereafter, classifying the milled talc particles by using a conventional dry classifying machine to remove particles having a size larger than the target size of from 3 to 5 μm. Alternatively, the milled talc particles are further milled by a conventional grinder and then the further milled particles are classified.

The talc particles of the component (C) may be surface-treated with at least one of various conventional surface-treating agents, unless the object of the present invention is hindered. The surface-treatment includes chemical and physical treatments with various surface-treating agents selected from silane-coupling agents, higher fatty acid compounds, fatty acid metal salts compounds, unsaturated organic acids and derivatives thereof, organic titanate compounds and resin acid compounds.

In a preferred embodiment (1) of the present invention, the polypropylene resin composition comprises:

(A) a crystalline ethylene-propylene block copolymer containing a fraction Ac thereof soluble in p-xylene at room temperature, which fraction Ac contains 18 to 22% by weight of copolymerized ethylene;

(B) a crystalline ethylene-propylene block copolymer containing a fraction Bc thereof soluble in p-xylene at room temperature, which fraction Bc contains 27 to 40% by weight of copolymerized ethylene; and (C) talc particles having an average particle size of 3 to 5 μm and a largest particle size of less than 20 μm, measured by a laser diffraction method, wherein (a) the p-xylene fractions Ac and Bc in the copolymer components (A) and (B) are in contents As and Bs, respectively, based on the total weight of the copolymer components (A) and (B), and the weight contents As and Bs satisfy the relationships (1a) and (2), $$As+Bs=8 \text{ to } 17\% \text{ by weight} \quad (1a);$$

and $$As/(As+Bs)=0.1 \text{ to } 0.6; \quad (2);$$

preferably As/(As+Bs)=0.3 to 0.5;

(b) an isotactic pentad fraction (mmmm) of copolymerized propylene contained in each of the copolymers (A) and (B) is 96% or more, and the mixture of the copolymer (A) with the copolymer (B) has a melt flow rate of 25 to 35 g/10 minutes determined at a temperature of 230° C. under a load of 2160 g; and (c) the total content of the copolymers (A) and (B) is 75 to 95% by weight, and the content of the talc (C) is 5 to 25% by weight, based on the total weight of the copolymers (A) and (B) and the talc particles (C).

In this embodiment (1), a total content (As+Bs) of the p-xylene-soluble fractions Ac and Bc in the copolymer components (A) and (B) is less than 8% of the total weight of the copolymer components (A) and (B) may cause the enhancing effect of the copolymer components (A) and (B) for the impact resistance and rigidity to be reduced. Also, if the total content (As +Bs) of the p-xylene-soluble fractions Ac and Bc is more than 17% of the total weight of the copolymer components (A) and (B), the resultant polypropylene resin composition exhibits unsatisfactory impact resistance and rigidity.

In the embodiment (1), the mixture of the copolymer (A) with the copolymer (B) preferably has a melt flow rate of 25 to 35 g/10 minutes, determined at a temperature of 230° C. under a load of 2160 g.

A melt flow rate of less than 25 g/10 minutes may cause a reduction in the fluidity and formability of the resultant polypropylene resin composition. Also, if the melt flow rate is more than 35 g/10 minutes, the resultant polypropylene resin composition exhibit an unsatisfactory impact resistance and the resultant shaped articles exhibit a poor fuse-bonding property.

In the embodiment (1), preferably the total content of the copolymer component (A) and the copolymer component (B) is 75 to 95% by weight, more preferably 80 to 90% by weight, and the content of the talc component (C) is 5 to 25% by weight.

If the total content of the copolymer components (A) and (B) is less than 75% by weight, the resultant polypropylene resin composition may exhibit a decreased formability. Also, if the total content is more than 95% by weight, the resultant polypropylene resin composition exhibits an insufficient rigidity and resistance to thermal deformation.

In this embodiment (1), the polypropylene resin composition optionally further comprises (D) 10% by weight or less of an ethylene-α-olefin copolymer rubber. The ethylene-α-olefin copolymer rubber (D) can be produced by a conventional copolymerization method, for example, a gas phase, solution or bulk copolymerization method using a known vanadium catalyst or titanium catalyst.

For the ethylene-α-olefin copolymer rubber component (D), the α-olefin preferably has 3 to 12 carbon atoms, and is more preferably selected from propylene and 1-butene.

In the embodiment (1) of the present invention, the ethylene-α-olefin copolymer rubber compound (D) is contained preferably in a content of 10% by weight or less, more preferably 8% by weight or less, based on the total weight of the components (A), (B), (C) and (D).

If the rubber content (D) is employed in a content of more than 10% by weight, in this embodiment (1), it may result in a reduction in rigidity, resistance to thermal deformation and resistance to stress whitening.

In the embodiment (1) of the present invention, the crystalline ethylene-propylene copolymer components (A) and (B), the talc component (C) and optionally the ethylene-α-olefin copolymer rubber component (D) may be further added with (E) 10 to 50 parts by weight, preferably 15 to 40 parts by weight, per 100 parts of the total content of the copolymer (A) and the copolymer (B), of a polypropylene homopolymer having an isotactic pentad fraction of 96% or more, and a melt flow rate of 25 to 30 g/10 minutes, determined at a temperature of 230° C. under a load 2160 g.

The addition of the polypropylene homopolymer component (E) advantageously results in enhancement of rigidity and resistance to stress whitening of the resultant polypropylene resin composition. If the content of the polypropylene homopolymer component (E) is more than 50 parts by weight, the resultant polypropylene resin composition exhibits a significantly reduced impact resistance. Also, the content of the polypropylene homopolymer component (E) of less than 10 parts by weight, is insufficient to effectively enhance the rigidity and resistance to stress whitening of the resultant polypropylene resin composition.

In another preferred embodiment (2) of the present invention, the polypropylene resin component comprises:

(A) a crystalline ethylene-propylene block copolymer containing a fraction Ac soluble in p-xylene at room temperature, which fraction Ac has an intrinsic viscosity of 7 dl/g or more, determined in decalin at a temperature of 135° C. and contains 18 to 22% by weight of copolymerized ethylene;

(B) a crystalline ethylene-propylene block copolymer containing a fraction Bc soluble in p-xylene at room temperature, which fraction Bc has an intrinsic viscosity of 4 dl/g or less, determined in decalin at a temperature of 135° C., and contains 27 to 40% by weigh of copolymerized ethylene;

(C) talc particles having an average particle size of 3 to 5 µm and a largest particle size of less than 20 µm, measured by a laser diffraction method; and (D) an ethylene-α-olefin copolymer, wherein (a) the p-xylene-soluble fractions Ac and Bc in the copolymers (A) and (B) are in contents As and Bs based on the total weight of the copolymers (A) and (B), and satisfying the relationships (1) and (2a):

$$As+Bs=7 \text{ to } 17\% \text{ by weight} \quad (1),$$

and $$As/(As+Bs)=0.2 \text{ to } 0.6 \quad (2a);$$

(b) an isotactic pentad fraction (mmmm) of copolymerized propylene contained in each of the copolymers (A) and (B) is 96% or more, and the mixture of the copolymer (A) with the copolymer (B) has a melt flow rate of 20 to 30 g/10 minutes determined at a temperature of 230° C. under a load of 2160 g; and (c) the total content of the copolymers (A) and (B) is 50 to 75% by weight, the content of the talc (C) is 5 to 30% by weight, and the content of the ethylene-α-olefin copolymer component (D) is 10 to 20% by weight.

The embodiment (2) of the polypropylene resin composition of the present invention is advantageous in that the resultant shaped articles from the composition exhibit, in addition to high rigidity, impact resistance and moldability, excellent visual qualities even when no paint-coating is applied. The visual qualities include flowmarks and gloss. Namely, the shaped articles, especially the interior parts of automobile, made from the polypropylene resin composition of the embodiment (2) of the present invention have no flowmarks and a preferable low gloss.

In the various polypropylene resin compositions of the embodiment (2), the properties of the crystalline ethylene-propylene block copolymers are variable depending on the weight content of the fraction soluble in p-xylene at room temperature, the weight content of the copolymerized ethylene in the p-xylene-soluble fraction and the intrinsic viscosity of the p-xylene-soluble fraction.

Namely, if the copolymerized ethylene content and the intrinsic viscosity are constant, the larger the content of the p-xylene-soluble fraction, the higher the impact resistance and the lower the rigidity of the resultant shaped articles.

If the p-xylene-soluble fraction content is constant, the lower the content of the copolymerized ethylene, the higher the mechanical strength and the lower the flowmark formation of the resultant polypropylene resin composition, and the higher the content of the copolymerized ethylene, the higher the impact resistance and the lower the gloss, of the resultant polypropylene resin composition. If the content of the copolymerized ethylene is constant, the higher the intrinsic viscosity of the p-xylene-soluble fraction, the lower the flowmark formation and thus the resultant shaped articles have an excellent appearance. The dependency of the flowmark formation on the intrinsic viscosity of the p-xylene-soluble fraction increases with a decrease in the content of the copolymerized ethylene in the p-xylene-soluble fraction. This phenomenon is derived from the fact that the lower the copolymerized ethylene content, the higher the solubility (compatibility) of the resultant p-xylene-soluble fraction (E/P copolymer rubber ingredient) in the polypropylene ingredient.

In the embodiment (2), the crystalline ethylene-propylene block copolymer component (A) effectively contributes to enhancing the mechanical strength and to preventing flowmark formation in the resultant polypropylene resin composition. Also, the copolymer component (B) advantageously contributes to enhance the impact resistance at low temperature and to improve the gloss of the resultant polypropylene resin composition.

In the p-xylene-soluble fraction Ac of the copolymer component (A), if the content of the copolymerized ethylene is less than 18% by weight, the resultant polypropylene resin composition exhibits a significantly reduced impact resistance. Also, if the content of the copolymerized ethylene is more than 22% by weight, the resultant copolymer component cannot sufficiently contribute to prevent flowmark formation. Further, if the intrinsic viscosity of the p-xylene-soluble fraction is less than 7 dl/g, the resultant copolymer component cannot sufficiently contribute to prevent the flowmark formation.

In the p-xylene-soluble fraction Bc of the copolymer compound (B), if the content of the copolymerized ethylene is less than 27% by weight, the resultant polypropylene resin composition exhibits an undesirably high gloss and an unsatisfactory impact resistance. Also, if the content of the copolymerized ethylene is more than 40% by weight, the resultant copolymer exhibits an insufficient contribution to enhancing the impact resistance of the resultant polypropylene resin composition. Further, if the intrinsic viscosity is more than 4 dl/g, the resultant copolymer component causes an undesirable formation of polymeric gel and thus the resultant polypropylene resin composition exhibits an unsatisfactory impact resistance.

In the embodiment (2), the ratio As/(As+Bs) is 0.2 to 0.6, preferably 0.3 to 0.5. If the ratio As/(As+Bs) is less than 0.2, the flowmark-preventing effect of the mixture of the copolymer component (A) and (B) in the embodiment (2) may be insufficient. Also, if the ratio As/(As+Bs) is more than 0.6, the resultant polypropylene resin composition exhibits an insufficient impact resistance at low temperature and an undesirably high gloss and thus is unsuitable for the interior parts of an automobile.

In the embodiment (2), the total content of the copolymer components (A) and (B) is 50 to 75% by weight, preferably 60 to 70% by weight. If the total content is less than 50% by weight, the resultant polypropylene resin composition exhibits an unsatisfactory formability. Also, the total content of more than 75% by weight may cause a reduction in the enhancing effect of the resultant mixture of the copolymer components (A) and (B) for rigidity, resistance to thermal deformation and impact resistance of the polypropylene resin composition.

The mixture of the copolymer components (A) and (B) usable for the embodiment (2) can be prepared by the same procedures as mentioned above.

In the embodiment (2), the talc component (C) is contained in a content of 5 to 15% by weight. The content of the talc component (C) of less than 15% by weight may cause a reduction in rigidity-enhancing effect, and if the content of the talc component (C) is more than 30% by weight, the resultant polypropylene resin composition exhibits an unsatisfactory formability and a promoted flowmark formation, and thus the resultant shaped articles have a poor appearance.

In the embodiment (1), the ethylene-α-olefin copolymer rubber compound (D) is contained in a content of 10 to 20% by weight, preferably 12 to 18% by weight. If the content is less than 10% by weight, it may cause a reduction in impact resistance of the polypropylene resin composition. Also, if the content of the ethylene-α-olefin copolymer rubber component (D) is more than 20% by weight, it results in significantly reduced rigidity and resistance to thermal deformation of the resultant polypropylene resin composition.

In the embodiment (2), the polypropylene resin composition optionally further comprises, in addition to the crystalline ethylene-propylene block copolymer compounds (A) and (B), the talc component (C) and the ethylene-α-olefin copolymer rubber component (D), (F) 10 to 200 parts by weight, preferably 50 to 150 parts by weight, per 100 parts by weight of the ethylene-α-olefin copolymer (D), of a straight or branched chain, hydrogenated polybutadiene block polymer which is represented by the general formula:

I-II or (I-II)n wherein I represents a hydrogenated polybutadiene block unit having a content of 1,2-vinyl structures of 20 molar % or less, II represents a hydrogenated polybutadiene block unit having a content of 1,2-vinyl structures of 30 to 70 molar %, n represents an integer of 2 or more, and which has a ratio [I/(I+II)] in weight of the hydrogenated polybutadiene block unit (I) to the total of the hydrogenated polybutadiene block units (I) and (II), of 15 to 45%.

The hydrogenated polybutadiene block polymer component (F) effectively contributes to prevent undesirable flowmark formation and to enhance the formability of the resultant polypropylene resin composition.

If the hydrogenated polybutadiene block polymer component (F) is employed in a content of less than 10 parts by weight per 100 parts by weight of the copolymer rubber component (D), the contribution of the component (F) to the impact resistance-enhancing effect may be insufficient. Also, if the component (F) is employed in a content of more than 200 parts by weight, the resultant polypropylene resin composition may exhibit an unsatisfactory fluidity.

In the preparation of the polypropylene resin composition of the present invention, the mixture of the crystalline ethylene-propylene copolymer components (A) and (B), the talc component (C), optionally the ethylene-α-olefin copolymer rubber component (D) and optionally the polypropylene homopolymer component (E) or the hydrogenated polybutadiene block polymer component (F) are blended in desired contents by a conventional blending method and apparatus, for example, a Henschel mixer, a V-blender or a ribbon blender; and the blend is melt-kneaded by a conventional method or apparatus, for example, a monoaxial extruder, biaxial extruder, a special biaxial extruder equipped with a feed inlet in the cylinder portion in addition to an usual feed inlet, a kneader or a Banbury mixer, and then pelletized.

In order to further enhance the performance of the shaped articles produced from the polypropylene resin composition of the present invention or to impart specific properties to the shaped articles, an additive comprising at least one member selected from, for example, antioxidants, ultraviolet ray absorbers, photostabilizers, pigments, dispersing agents, painting property-improving agents, formability-improving agents, antistatic agents, lubricants, nucleators, and releasers, may be added to the polypropylene resin composition, during or after the preparation thereof. Particularly, the antioxidants, ultraviolet ray absorbers, photostabilizers or pigments are preferably added to the polypropylene resin composition of the present invention.

The antioxidants usable for the polypropylene resin composition of the present invention include 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylaniline)-2,4-bisoctyl-thio-1,3,5-triazine, n-octadecyl-3-(4'-hydroxy-3',5'-di-tert-butylphenyl) propionate, tris-(2-methyl-4-hydroxy-5-tert-butylphenyl) butane, tetrakis-[methylene-3-(3',5'-di-tert-butyl-4'-hydroxyphenyl) propionate] methane, 1,3,5-trimethyl-2,4,6-tris(3,5-di-tert-butyl-4-hydroxybenzyl) benzene, and dilauryl-thio-dipropionate.

The ultraviolet ray absorbers and photostabilizers usable for the present invention include 2-hydroxy-4-n-octoxybenzophenone, 2-hydroxy-4-octadecyloxybenzophenone, 4-dodecyloxy-2-hydroxybenzophenone, 2-(2'-hydroxy-3'-tert-butyl-5'-methylphenyl)-5-chlorobenzotriazole, bis-(2,2,6,6-tetramethyl-4-piperidyl) sebacate, 1,2,3,4-butanetetracarboxylic acid-1,2,2,66-penta-methyl-4-piperidinoltridecylalcohol condensates.

EXAMPLES

The present invention will be further illustrated by the following examples which are merely representative and do not in any way restrict the scope of the present invention.

In the examples, the following tests were effected.

For the tests, test pieces were prepared from resin compositions by using an injection molding apparatus (model:

J100SAII, made by Nihon Seiko K.K.) at a cylinder temperature of 230° C. and at a mold temperature of 40° C.

TESTS (1) Melt flow rate (MFR)

The melt flow rate measurement was carried out in accordance with ASTM D 1238, at a temperature of 230° C. under a load of 2160 g.

(2) Density (d)

The density determination was carried out in accordance with ASTM D 1505.

(3) Tensile yield strength (TYS)

The tensile yield strength measurement was carried out in accordance with ASTM D 638.

(4) Flexural modulus of elasticity (FM)

The flexural modulus measurement is carried out in accordance with ASTM D 790.

(5) Thermal deformation temperature (HDT)

The measurement of thermal deformation temperature is carried out in accordance with ASTM D 648, under a fiber stress of 18.5 kg/cm$^2$.

(6) Surface hardness

The measurement of surface hardness is carried out in accordance with ASTM D 785, using a steel ball R. The test result was indicated in accordance with the R scale.

(7) Izod impact strength (IZOD)

The measurement of Izod impact strength was carried out in accordance with ASTM D 256, at a temperature of 23° C.

(8) High speed impact strength (HSI)

A shaped disc having a diameter of 100 mm and a thickness of 1.6 mm was used as a specimen. A round missile having a diameter of 1 inch fell onto the specimen disc at a speed of 2.5 m/sec at a temperature of –10° C., to provide a stress-strain curve of the specimen disc during breaking. A breaking energy of the specimen disc was calculated from an area measured from the stress-strain curve.

(9) Whitening resistance

A Du Pont impact test was applied to a specimen consisting of a shaped disc having a diameter of 100 mm and a thickness of 1.6 mm. The whitened appearance of the specimen disc was observed and evaluated by the naked eye.

Du Pont impact test conditions: 500 g load ×10 cm,

Missile diameter : ½ inch

Evaluation

3: No whitening

2: Slightly whitened

1: Significantly whitened

(10) Brittle temperature (BT)

The measurement of brittle temperature was carried out in accordance with ASTM D 746.

(11) Flowmark formation

Flowmark is ordered stripe-shaped roughness formed on a molded article at right angle to a flow direction when the molding surface is not faithfully transferred to the molded article, and is a phenomenon in which strains in the order of μm are formed on the surface of the molded article.

In the measurement of the flowmark formation, an injection molding operation is carried out by using a mold for the measurement of resin flow length, provided with a spiral flow channel and having a thickness of 3 mm, a width of 10 mm and a length of 2000 m. A resin flow length at which the flowmark formation is started was measured. A ratio in % of the resin flow length at which the flowmark formation is started to the total resin flow length was calculated.

(12) Gloss

A flat rectangular specimen having a thickness of 3 m, a length of 75 mm and a width of 150 mm was molded by using a mirror-finished mold by an injection molding method. The injection molding was carried out by using an injection molding machine (Model: M100SJ, made by (K.K.) Meiki Seisakusho) was employed at a cylinder temperature of 210° C. and at a mold temperature of 40° C.

The gloss of the specimen was measured at a center portion of the specimen by using a digital varied angle glossmeter (Model: VG-1D, made by Nihon Denshokukogyo K.K.) in accordance with Japanese Industrial Standard (JIS) Z8741-Method-2, at an angle of incidence of 60 degrees and at an angle of reception of 60 degrees.

Examples 1 to 6 and Comparative Examples 1 to 13

In each of Examples 1 to 6 and Comparative Examples 1 to 13, the following component materials were employed.

(1) Crystalline ethylene-propylene block copolymers (A) and (B) were selected from those having the melt flow ratio and compositions shown in Tables 1 and 2, respectively.

TABLE 1

| Crystalline ethylene-propylene block copolymer (A) | | | | | | |
|---|---|---|---|---|---|---|
| Type of copolymer (A) | PP-A1 | PP-A2 | PP-A3 | PP-A4 | PP-A5 | PP-A6 |
| MFR (g/10 min.) | 30 | 33 | 30 | 33 | 32 | 45 |
| mmmm (%) | 97.4 | 97.5 | 97.2 | 97.8 | 97.7 | 97.7 |
| Weight content of p-xylene-soluble fraction Ac (wt %) | 13 | 10 | 13 | 13 | 5 | 13 |
| Ethylene content in fraction Ac (wt %) | 20 | 19 | 25 | 15 | 19 | 20 |

TABLE 2

| Crystalline ethylene-propylene block copolymer (B) | | | | | |
|---|---|---|---|---|---|
| Type of copolymer (B) | PP-B1 | PP-B2 | PP-B3 | PP-B4 | PP-B5 |
| MFR (g/10 min) | 28 | 34 | 31 | 33 | 44 |
| mmmm (%) | 97.4 | 97.6 | 97.4 | 97.8 | 97.5 |
| Weight content of p-xylene-soluble fraction Bc (wt %) | 14 | 10 | 14 | 5 | 13 |
| Ethylene content in fraction Bc (wt %) | 34 | 33 | 45 | 33 | 33 |

(2) Talc (C)

Two different types of classified talc T-1 and T-2 made by Calceed K.K. were employed. The talc T-1 had an average particle size of 4.1 μm and a largest particle size of 15 μm. The talc T-2 had an average particle size of 6 μm and a largest particle size of 30 μm.

(3) Ethylene-α-olefin copolymer rubber (D)

Two different types of ethylene-α-olefin copolymer rubbers R-1 and R-2 were employed.

R-1: An ethylene-propylene copolymer rubber having a mooney viscosity (ML$_{1+4}$ (100° C.)) of 24 and a copolymerized propylene content of 26% by weight, and available under the trademark of EP 02P, from Nihon Goseigomu K.K.

R-2: An ethylene-butene-1 copolymer rubber having a melt index of 4 at a temperature of 190° C. and a copolymerized butene-1 content of 20% by weight, and available under the trademark of A 4085, from Mitsui Sekiyukagaku K.K.

(4) Polypropylene homopolymer (E)

H-1: A polypropylene homopolymer having an MFR of 31 and an mmmm of 98%.

(5) Additive (parts by weight)

2, 6-di-tert-butyl-4-methylphenol: 0.1 part

Tetrakis-[methylene-3-(3',5'-di-tert-butyl-4'-hydroxyphenyl)propionate]methane: 0.2 part Bis-(2,2,6,6-tetramethyl-4-piperidyl) sebacate: 0.2 part (6) Pigment (parts by weight)

Iron oxides: 0.7 part

Titanium dioxide: 0.3 part

In each of Examples 1 to 6 and Comparative Examples 1 to 13, the crystalline ethylene-propylene block copolymers (A) and (B), the talc (C), the ethylene-α-olefin copolymer rubber (D) and the polypropylene homopolymer (E) of the types indicated in Tables 3 and 4 were blended in the amounts indicated in parentheses in Tables 3 and 4 with the above-mentioned types and amounts of additive and pigment by using a tumbler mixer, and the blend was melt-kneaded and then pelletized by using a biaxial knead-extruder. The pellets were molded into specimens by using an injection molding machine. The specimens were employed in the above-mentioned tests.

The test results are shown in Tables 3 and 4.

TABLE 3

| Item | | | Example | | | Comparative Example | | | | | | | | |
|---|---|---|---|---|---|---|---|---|---|---|---|---|---|---|
| | | | 1 | 2 | 3 | 1 | 2 | 3 | 4 | 5 | 6 | 7 | 8 | 9 |
| Component (wt %) | | A | PP-A1 (27) | PP-A1 (36) | PP-A1 (45) | PP-A1 (90) | — | PP-A3 (90) | PP-A4 (36) | PP-A3 (36) | PP-A1 (36) | PP-A6 (36) | PP-A1 (7) | PP-A1 (63) |
| | | B | PP-B1 (63) | PP-B1 (54) | PP-B1 (45) | — | PP-B1 (90) | — | PP-B1 (54) | PP-B1 (54) | PP-B3 (54) | PP-B5 (54) | PP-B1 (83) | PP-B1 (27) |
| | | C | T-1 (10) | T-1 (10) | T-1 (10) | T-1 (10) | T-1 (10) | T-1 (10) | T-1 (10) | T-1 (10) | T-1 (10) | T-1 (10) | T-1 (10) | T-1 (10) |
| | As + Bs (wt %) | | 13.7 | 13.6 | 13.5 | 13.0 | 14.0 | 13.0 | 13.6 | 13.6 | 13.6 | 13.0 | 13.9 | 13.3 |
| | As/(As + Bs) | | 0.28 | 0.38 | 0.48 | 1.0 | 0 | 1.0 | 0.38 | 0.38 | 0.38 | 0.40 | 0.07 | 0.68 |
| Test result | MFR | (g/10 min) | 29 | 28 | 28 | 29 | 27 | 28 | 30 | 28 | 29 | 42 | 28 | 29 |
| | d | | 0.97 | 0.97 | 0.97 | 0.97 | 0.97 | 0.97 | 0.97 | 0.97 | 0.97 | 0.97 | 0.97 | 0.97 |
| | TYS | (MPa) | 29.5 | 29.7 | 30.0 | 32.5 | 27.0 | 29.7 | 30.1 | 28.5 | 29.1 | 29.8 | 27.5 | 31.5 |
| | FM | (MPa) | 2480 | 2480 | 2470 | 2450 | 2500 | 2470 | 2470 | 2480 | 2500 | 2500 | 2480 | 2470 |
| | IZOD | (J/m) | 75 | 72 | 70 | 60 | 80 | 65 | 58 | 75 | 55 | 62 | 78 | 65 |
| | HDT | (° C.) | 86 | 86 | 87 | 88 | 83 | 86 | 86 | 84 | 84 | 87 | 83 | 86 |
| | RH | R-scale | 86 | 87 | 88 | 90 | 78 | 87 | 87 | 84 | 83 | 87 | 78 | 88 |
| | HSI | (kg-cm) | 280 | 260 | 250 | 50 | 350 | 150 | 110 | 270 | 200 | 160 | 300 | 150 |
| | Whitening resistance | Naked eye observation | 3 | 3 | 3 | 3 | 1 | 2 | 3 | 1 | 1 | 3 | 1 | 3 |

TABLE 4

| Item | | | Example | | | Comparative Example | | | |
|---|---|---|---|---|---|---|---|---|---|
| | | | 4 | 5 | 6 | 10 | 11 | 12 | 13 |
| Component (wt %) | | A | PP-A2 (34) | PP-A2 (34) | PP-A1 (26) | PP-A5 (32) | PP-A1 (36) | PP-Al (33) | PP-A1 (40) |
| | | B | PP-B2 (51) | PP-B2 (51) | PP-B1 (39) | PP-B4 (49) | PP-B1 (54) | PP-B1 (51) | PP-B1 (60) |
| | | E | — | — | H-1 (20) | — | — | — | — |
| | | D | R-1 (5) | R-2 (5) | R-1 (5) | R-1 (9) | — | — | — |
| | | C | T-1 (10) | T-1 (10) | T-1 (10) | T-1 (10) | T-2 (10) | T-1 (16) | — |
| | As + Bs (wt %) | | 10.0 | 10.0 | 13.6 | 5.0 | 13.6 | 13.6 | 13.6 |
| | As/(As + Bs) | | 0.4 | 0.4 | 0.3 | 0.38 | 0.38 | 0.38 | 0.38 |
| Test results | MFR | g/10 min | 29 | 31 | 30 | 26 | 28 | 24 | 30 |
| | d | | 0.97 | 0.97 | 0.97 | 0.97 | 0.97 | 1.01 | 0.91 |
| | TYS | MPa | 29.0 | 29.5 | 29.9 | 27.0 | 29.2 | 29.5 | 29.3 |
| | FM | MPa | 2400 | 2450 | 2490 | 2350 | 2380 | 2800 | 1700 |
| | IZOD | J/m | 76 | 73 | 71 | 75 | 68 | 63 | 72 |
| | HDT | ° C. | 84 | 86 | 87 | 78 | 82 | 88 | 78 |
| | RH | R-scale | 83 | 87 | 88 | 78 | 86 | 86 | 87 |
| | HSI | kg-cm | 280 | 250 | 290 | 310 | 220 | 130 | 200 |
| | Whitening resistance | Naked eye observation | 3 | 3 | 3 | 1 | 3 | 3 | 3 |

Tables 3 and 4 illustrate that the products of Examples 1 to 6 are satisfactory in all the test results thereof, whereas the products of Comparative Examples 1, 3, 4, 7 and 9 are unsatisfactory in the impact resistance such as the Izod impact strength (IZOD) and the high speed impact strength (HSI) thereof, the products of Comparative Examples 2, 5, 6, 8 and 10 are unsatisfactory in tensile yield strength (TYS) and stress whitening resistance thereof and thus are unsuitable for interior parts of automobile, the products of Comparative Examples 11 and 13 are unsatisfactory in balance of flexural modulus of elasticity (FM) with Izod impact strength thereof, and the product of Comparative Example 12 is unsatisfactory in impact resistance and density (d) thereof.

Examples 7 to 10 and Comparative Examples 14 to 28

In each of Examples 7 to 10 and Comparative Examples 14 to 28, the following component materials were employed.

(1) Crystalline ethylene-propylene block copolymers (A) and (B) were selected from those having the melt flow ratio and compositions shown in Tables 5 and 6, respectively.

TABLE 5

Crystalline ethylene-propylene block copolymer (A)

| Type of copolymer (A) | PP-A7 | PP-A8 | PP-A9 | PP-A10 | PP-A11 | PP-A12 |
|---|---|---|---|---|---|---|
| MFR (g/10 min.) | 25 | 24 | 26 | 25 | 26 | 40 |
| mmmm (%) | 97.1 | 97.2 | 97.4 | 97.3 | 97.2 | 97.4 |
| Weight content of p-xylene-soluble fraction Ac (wt %) | 11 | 12 | 11 | 11 | 5 | 11 |
| Ethylene content in fraction Ac (wt %) | 20 | 25 | 15 | 20 | 20 | 19 |
| Intrinsic viscosity of p-xylene soluble fraction Ac (dl/g) | 8.0 | 8.1 | 8.2 | 4.1 | 8.0 | 7.5 |

TABLE 6

Crystalline ethylene-propylene block copolymer (B)

| Type of copolymer (B) | PP-B6 | PP-B7 | PP-B8 | PP-B9 | PP-B10 |
|---|---|---|---|---|---|
| MFR (g/10 min) | 25 | 26 | 25 | 26 | 42 |
| mmmm (%) | 97.5 | 97.4 | 97.6 | 97.5 | 97.6 |
| Weight content of p-xylene-soluble fraction Bc (wt %) | 12 | 11 | 11 | 6 | 10 |
| Ethylene content in fraction Bc (wt %) | 31 | 41 | 32 | 31 | 29 |
| Intrinsic viscosity of p-xylene-soluble fraction Bc (dl/g) | 3.5 | 3.5 | 6.5 | 4.1 | 3.1 |

(2) Talc (C)

T-1 and T-2, which are the same as those employed in Example 1, were used.

(3) Ethylene-α-olefin copolymer rubber (D)

R-1 and R-2, which are the same as in Example 1, were used.

(4) Hydrogenated polybutadiene block polymer (F)

A hydrogenated polybutadiene block polymer R-3, which was of the formula (I–II)n wherein n represents 4, and had a melt index of 5 determined at a temperature of 230° C. under a load of 10 kg, a weight ratio [I/(I+II)] of 17%, and a content of 1,2-vinyl structure in hydrogenated butadiene block unit II of 45%, was employed as a polymer (F). R-3 was available under the trademark of Dinalon, made from Nihon Goseigomu K.K.

The types of the component materials shown in Tables 7 and 8 were blended in the amounts indicated in parentheses in Tables 7 and 8 and pelletized in the same manner as in Example 1. The pellets were molded into specimens in an injection molding method. The specimens were subjected to the above-mentioned tests.

The test results are shown in Tables 7 and 8.

TABLE 7

| | Item | | Example | | | | Comparative Example | | | | | | |
|---|---|---|---|---|---|---|---|---|---|---|---|---|---|
| | | | 7 | 8 | 9 | 10 | 14 | 15 | 16 | 17 | 18 | 19 | 20 |
| Component (wt %) | A | | PP-A1 (33) | PP-A1 (27) | PP-A1 (20) | PP-A1 (27) | PP-A1 (66) | — | PP-A2 (66) | PP-A1 (27) | PP-A1 (27) | PP-A3 (27) | PP-A2 (27) |
| | B | | PP-B1 (33) | PP-B1 (39) | PP-B1 (46) | PP-B1 (39) | — | PP-B1 (66) | — | PP-B2 (39) | PP-B3 (39) | PP-B1 (39) | PP-B1 (39) |
| | D | R-1 | (7) | (7) | (7) | (4) | (7) | (7) | (7) | (7) | (7) | (7) | (7) |
| | | R-2 | (7) | (7) | (7) | (4) | (7) | (7) | (7) | (7) | (7) | (7) | (7) |
| | F | R-3 | — | — | — | (6) | — | — | — | — | — | — | — |
| | C | | T-1 (20) | T-1 (20) | T-1 (20) | T-1 (20) | T-1 (20) | T-1 (20) | T-1 (20) | T-1 (20) | T-1 (20) | T-1 (20) | T-1 (20) |
| | As + Bs (wt %) | | 11.5 | 11.6 | 11.7 | 11.6 | 11.0 | 12.0 | 12.0 | 11.0 | 11.0 | 11.6 | 12.0 |
| | As/(As + Bs) | | 0.48 | 0.39 | 0.28 | 0.35 | 1.0 | 0 | 1.0 | 0.41 | 0.41 | 0.39 | 0.41 |
| Test result | MFR | g/10 min. | 12 | 11 | 12 | 10 | 11 | 12 | 12 | 11 | 13 | 11 | 12 |
| | FM | (MPa) | 2620 | 2620 | 2650 | 2700 | 2600 | 2660 | 2630 | 2640 | 2650 | 2600 | 2640 |
| | IZOD | (J/m) | 400 | 390 | 330 | 420 | 430 | 210 | 320 | 150 | 240 | 220 | 260 |
| | HDT | ° C. | 88 | 87 | 85 | 86 | 90 | 81 | 86 | 84 | 87 | 87 | 83 |
| | RH | R-scale | 78 | 77 | 75 | 76 | 82 | 68 | 76 | 74 | 78 | 79 | 74 |
| | BT | (° C.) | -2.1 | -3.5 | -4.5 | -5.1 | +10.0 | -6.8 | +4.5 | -5.8 | +7.3 | +11.5 | -3.5 |
| | Flowmark | (%) | 25 | 30 | 38 | 41 | 20 | 92 | 30 | 45 | 20 | 25 | 55 |
| | Gloss | (%) | 47 | 42 | 40 | 38 | 75 | 35 | 70 | 33 | 44 | 55 | 42 |

TABLE 8

| | Item | | Comparative Example | | | | | | | |
|---|---|---|---|---|---|---|---|---|---|---|
| | | | 21 | 22 | 23 | 24 | 25 | 26 | 27 | 28 |
| Component (wt %) | A | | PP-A4 (27) | PP-A1 (6) | PP-A1 (46) | PP-A5 (25) | PP-A6 (27) | PP-A1 (27) | PP-A1 (30) | PP-A1 (22) |
| | B | | PP-B1 (39) | PP-B1 (60) | PP-B1 (20) | PP-B4 (37) | PP-B5 (39) | PP-B1 (39) | PP-B1 (45) | PP-B1 (33) |
| | D | R-1 | (7) | (7) | (7) | (9) | (7) | (7) | (5) | (25) |
| | | R-2 | (7) | (7) | (7) | (9) | (7) | (7) | — | — |
| | F | | — | — | — | — | — | — | — | — |
| | C | | T-1 (20) | T-1 (20) | T-1 (20) | T-1 (20) | T-1 (20) | T-2 (20) | T-1 (20) | T-1 (20) |
| | As + Bs (wt %) | | 11.6 | 11.9 | 11.3 | 5.26 | 10.4 | 11.5 | 11.6 | 11.0 |
| | As/(As + Bs) | | 0.39 | 0.08 | 0.68 | 0.36 | 0.43 | 0.48 | 0.38 | 0.38 |
| Test result | MFR | g/10 min. | 12 | 12 | 11 | 8 | 25 | 12 | 15 | 5 |
| | FM | MPa | 2450 | 2660 | 2650 | 2680 | 2650 | 2410 | 3200 | 1900 |
| | IZOD | J/m | 400 | 230 | 410 | 220 | 130 | 280 | 76 | 510 |
| | HDT | °C. | 85 | 82 | 87 | 82 | 86 | 83 | 92 | 65 |
| | RH | R-scale | 76 | 70 | 78 | 76 | 78 | 76 | 84 | 50 |
| | BT | °C. | +8.3 | −5.8 | +2.1 | +4.6 | +6.1 | −0.5 | +15.2 | −25.5 |
| | Flowmark | % | 68 | 78 | 25 | 62 | 25 | 40 | 22 | 71 |
| | Gloss | % | 45 | 38 | 70 | 50 | 50 | 43 | 43 | 65 |

Tables 7 and 8 clearly show that all the resultant polypropylene resin compositions of Examples 7 to 10 are satisfactory in all the test results, whereas the products of Comparative Examples 14, 16 and 23 are insufficient in brittle temperature (BT) and gloss, the product of Comparative Examples 17, 18, 19, 25 and 27 are unsatisfactory in impact resistance such as Izod impact strength and brittle temperature, the products of Comparative Examples 15, 20, 21, 22 and 24 are unsatisfactory in flowmark formation and appearance, and the product of Comparative Example 18 is unsatisfactory due to the significantly low resistance to thermal deformation.

The polypropylene resin composition of the present invention comprises two specific types of crystalline ethylene-propylene block copolymers (A) and (B) different from each other in content of copolymerized ethylene contained in a fraction soluble in p-xylene at room temperature, and optionally intrinsic viscosity of the p-xylene-soluble fraction, in specific weight contents As and Bs, in addition to talc (C) and optionally, the ethylene-α-olefin copolymer rubber (D) and optionally the polypropylene homopolymer (E) or the hydrogenated polybutadiene block polymer (F).

The combination of the specific crystalline ethylene-propylene block copolymers (A) and (B) advantageously contribute to enhance rigidity, resistance to thermal deformation and impact resistance, to prevent flowmark formation, and to impart an appropriate gloss to the polypropylene resin composition.

The polypropylene resin composition of the present invention has excellent mechanical strength, formability (moldability) and good aesthetic appearance, and thus is useful for interior parts, such as an instrument panel, of an automobile.

We claim:

1. A polypropylene resin composition comprising:
(A) a crystalline ethylene-propylene block copolymer in which a fraction Ac soluble in p-xylene at room temperature and containing 18 to 22% by weight of copolymerized ethylene is contained;
(B) a crystalline ethylene-propylene block copolymer in which a fraction Bc soluble in p-xylene at room temperature and containing 27 to 40% by weight of copolymerized ethylene is contained; and
(C) talc particles having an average particle size of 3 to 5 μm and a largest particle. size of less than 20 μm, measured by a laser diffraction method, wherein
(a) the p-xylene-soluble fractions Ac and Bc are in contents As and Bs, respectively, based on the total weight of the copolymers (A) and (B), and satisfying the relationships (1) and (2):

$$As+Bs=7 \text{ to } 17\% \text{ by weight} \tag{1},$$

and $$As/(As+Bs)=0.1 \text{ to } 0.6 \tag{2};$$

(b) an isotactic pentad fraction (mmmm) of copolymerized propylene contained in each of the copolymers (A) and (B) is 96% or more, and the mixture of the copolymer (A) with the copolymer (B) has a melt flow rate of 20 to 35 g/10 minutes determined at a temperature of 230° C. under a load of 2160 g; and
(c) the total content of the copolymers (A) and (B) is 50 to 95% by weight, and the content of the talc (C) is 5 to 50% by weight, based on the total weight of the copolymers (A) and (B) and the talc particles (C).

2. The polypropylene resin composition as claimed in claim 1, wherein the contents As and Bs of the p-xylene-soluble fractions Ac and Bc satisfies the relationship (1a):

$$As+Bs=8 \text{ to } 17\% \text{ by weight} \tag{1a};$$

the mixture of the copolymer (A) with the copolymer (B) has a melt flow rate of 25 to 35 g/10 minutes, determined at a temperature of 230° C. under a load of 2160 g;
the total content of the copolymer (A) and the copolymer (B) is 75 to 95% by weight; and the content of the talc (C) is 5 to 25% by weight, based on the total weight of the copolymers (A) and (B) and the talc particles (C).

3. The polypropylene resin composition as claimed in claim 2, further comprising (D) an ethylene-α-olefin copolymer rubber in a content of 10% by weight or less, based on the total weight of the copolymers (A) and (B), the talc particles (C) and the rubber (D).

4. The polypropylene resin composition as claimed in claim 2 or 3, further comprising (E) 10 to 50 parts by weight, per 100 parts of the total of the copolymer (A) and the copolymer (B), of a polypropylene homopolymer having an isotactic pentad fraction of 96% or more, and a melt flow rate of 25 to 35 g/10 minutes, determined at a temperature of 230° C. under a load of 2160 g.

5. The polypropylene resin composition as claimed in claim 1, in which the p-xylene-soluble fraction of the copolymer (A) has an intrinsic viscosity of 7 dl/g or more, determined in decalin at a temperature of 135° C.; the p-xylene-soluble fraction of the copolymer (B) has an intrinsic viscosity of 4 dl/g or less, determined in decalin at a temperature of 135° C.; the contents As and Bs of the p-xylene-soluble fractions Ac and Bc contained in the copolymers (A) and (B) satisfy the relationship (2a):

$$As/(As+Bs)=0.2 \text{ to } 0.6 \tag{2a};$$

the mixture of the copolymer (A) with the copolymer (B) has a melt flow rate of 20 to 30 g/10 minutes determined at a temperature of 230° C. under a load of 2160 g; the total content of the copolymer (A) and the copolymer (B) is 50 to 75% by weight; and the content of the talc (C) is 15 to 30% by weight, and which further comprises (D) 10 to 20% by weight of an ethylene-α-olefin copolymer.

6. The polypropylene resin composition as claimed in claim 5, further comprising (F) 10 to 200 parts by weight, per 100 parts by weight of the ethylene-α-olefin copolymer (D), of a straight or branched chain, hydrogenated polybutadiene block polymer which is represented by the general formula:

$$I-II$$

or $$(I-II)n$$

wherein I represents a hydrogenated polybutadiene block unit having a content of 1,2-vinyl structures of 20 molar % or less, II represents a hydrogenated polybutadiene block unit having a content of 1,2-vinyl structures of 30 to 70 molar %, n represents an integer of 2 or more, and which has a ratio [I/(I+II)] in weight of the hydrogenated polybutadiene block unit (I) to the total of the hydrogenated polybutadiene block units (I) and (II), of 15 to 45%.

* * * * *